(12) United States Patent
Cormier et al.

(10) Patent No.: US 9,644,699 B2
(45) Date of Patent: May 9, 2017

(54) ENERGY ABSORBER WITH ANTI-BSR ACCESSORY

(71) Applicant: OAKWOOD ENERGY MANAGEMENT, INC., Dearborn, MI (US)

(72) Inventors: Joel M. Cormier, Lathrup Village, MI (US); Michael A. Rossi, Grosse Ile, MI (US); Donald S. Smith, Commerce, MI (US); Richard F. Audi, Dearborn, MI (US); Aton Mahdi, Belleville, MI (US)

(73) Assignee: Oakwood Energy Management, Inc., Dearborn, MI (US)

( * ) Notice: Subject to any disclaimer, the term of this patent is extended or adjusted under 35 U.S.C. 154(b) by 306 days.

(21) Appl. No.: 14/483,536

(22) Filed: Sep. 11, 2014

(65) Prior Publication Data
US 2016/0076619 A1    Mar. 17, 2016

(51) Int. Cl.
*F16F 5/00* (2006.01)
*F16F 7/12* (2006.01)
*B60R 21/04* (2006.01)

(52) U.S. Cl.
CPC .............. *F16F 7/12* (2013.01); *B60R 21/04* (2013.01); *B60R 2021/0442* (2013.01)

(58) Field of Classification Search
CPC .. F16F 7/123; F16F 1/373; F16F 13/10; F16F 13/16; F16F 1/025; F16F 1/376; F16F 3/023; B60R 13/0815
USPC ............................................ 267/140.11, 242
See application file for complete search history.

(56) References Cited

U.S. PATENT DOCUMENTS

| | | | |
|---|---|---|---|
| 2,225,067 A * | 12/1940 | Marin | E05F 5/02 16/86 A |
| 2,924,419 A | 2/1960 | Wells | |
| 5,054,753 A * | 10/1991 | Polus | A43B 13/203 267/140.11 |
| 5,383,314 A | 1/1995 | Rothberg | |
| 5,619,832 A | 4/1997 | Myrvold | |
| 6,017,084 A | 1/2000 | Carroll, III et al. | |
| 6,199,942 B1 | 3/2001 | Carroll, III et al. | |
| 6,221,292 B1 | 4/2001 | Carroll, III | |
| 6,247,745 B1 | 6/2001 | Carroll, III et al. | |
| 6,679,967 B1 | 1/2004 | Carroll, III et al. | |
| 6,682,128 B2 | 1/2004 | Carroll, III et al. | |
| 6,752,450 B2 | 6/2004 | Carroll, III et al. | |
| 7,143,876 B2 * | 12/2006 | Tamada | B60R 19/18 188/371 |

(Continued)

OTHER PUBLICATIONS

International Search Report and Written Opinion; International application No. PCT/US2015/014586; date of mailing May 11, 2015.

*Primary Examiner* — Bradley King
*Assistant Examiner* — Mahbubur Rashid
(74) *Attorney, Agent, or Firm* — Brooks Kushman P.C.

(57) ABSTRACT

An energy absorber includes a base sheet and a plurality of energy absorbing units with end walls and associated leaf spring or helicoid accessories extending from the base sheet. The accessories reduce buzzes, squeaks and rattles associated with an environment of use. In one embodiment, the leaf springs are defined by slits in a domed portion of the end walls. In another embodiment, the helicoid is formed by for example a milling step performed on an end wall. The side walls buckle or bend after absorbing energy. Methods related to the above are also described.

17 Claims, 7 Drawing Sheets

(56) References Cited

U.S. PATENT DOCUMENTS

| | | | |
|---|---|---|---|
| 7,360,822 B2 | 4/2008 | Carroll, III et al. | |
| 7,377,577 B2 | 5/2008 | Cormier et al. | |
| 7,384,095 B2 | 6/2008 | Cormier et al. | |
| 7,404,593 B2 | 7/2008 | Cormier et al. | |
| 7,837,183 B2 * | 11/2010 | Ohki | F16F 13/10 248/562 |
| 8,465,087 B2 | 6/2013 | Gerwolls et al. | |
| 8,777,191 B2 * | 7/2014 | Kligerman | F16F 1/373 188/371 |
| 2007/0187961 A1 * | 8/2007 | Audi | A62B 1/22 293/134 |
| 2010/0244469 A1 | 9/2010 | Gerwolls et al. | |

* cited by examiner

ENERGY ABSORBER WITH ANTI-BSR ACCESSORY

CROSS REFERENCE TO RELATED APPLICATIONS

This application relates to U.S. Ser. No. 14/257,408, filed Apr. 21, 2014 from provisional application Ser. No. 61/164,700, filed Mar. 30, 2009, entitled ENERGY ABSORBER WITH ANTI-BSR COUNTERMEASURE, the entire contents of which applications being incorporated herein by reference.

BACKGROUND OF THE INVENTION (1) Technical Field

The present invention relates to energy absorbers with anti-buzz, squeak and rattle ("BSR") accessories. The energy absorbers and associated accessories are interposed between for example a vehicular outer skin and an interior structure such as a headliner. The energy absorbers and accessories are provided in automotive and non-automotive applications.

(2) Background Art

Vehicle manufacturers spend considerable time and effort to eliminate buzz/squeak/rattle ("BSR") noises because they can be irritating and annoying to vehicle drivers and passengers, particularly when the BSR noises come from a location close to a passenger's head, and/or any component in the vehicle's passenger compartment, especially when the noises are created near or are amplified by components that effectively form an echo chamber.

Several shaped thermoformed energy absorbers are known, such as those described in U.S. Pat. Nos. 6,017,084; 6,221,292; 6,199,942; 6,247,745; 6,679,967; 6,682,128; 6,752,450; 7,360,822; 7,377,577; 7,384,095; and 7,404,593. These absorbers are said to provide dynamic reaction force characteristics that produce a relatively "square wave" characteristic when observing their reaction force properties as a function of deflection. But such absorbers lack effective anti-BSR features.

U.S. Pat. No. 8,465,087 describes a formed energy absorber with an integrated anti-BSR feature which includes a protrusion that suppresses or dampens buzzes, squeaks or rattles at the end wall of an energy absorbing structure. Such structures typically lie between a Class-A surface (such as a bumper fascia, a headliner, or a door trim panel) and a rigid sheet metal structure in automotive applications. The absorber is typically installed with a 3-5 mm gap from one surface and is attached to another. However, in some instances it becomes necessary to reduce the gap to improve the reaction response time at the primary area of impact prior to secondary impacts, as for example when the head hits adjacent structures. When the absorber contacts the opposing surface, an undesirable buzz or rattle can be heard. This noise occurs because a flat hard plastic surface can tap or vibrate against the opposing structure.

The '087 patent describes an anti-BSR feature that is made integrally with an associated energy absorber during the thermoforming process. However, this feature has proven difficult to form consistently, requires relatively a narrow processing window, and generally lacks the flexibility necessary to fully mitigate the translation of one structure to another that creates a BSR condition.

Materials such as foam, felt, and flock are often added to absorbers which lack an integrated structure to remedy the BSR issue. A fabric pad, flock material, foam padding, or some other kind of flexible material if added to one of the surfaces responsible for making the noise may lessen or eliminate the severity of the buzzing or tapping or eliminate the possibility of one surface translating into the other. However, this solution requires the purchase and assembly of one or more separate components, and that results in added complexity, cost, and mass.

BRIEF SUMMARY OF THE INVENTION

One aspect of the present invention includes a base sheet and a plurality of energy absorbing units extending from the base sheet. The energy absorbing units can be made by such processes as injection molding or thermoforming or variants of these processes. Each energy absorbing unit includes a side wall that even when subjected to multiple hits deflects while absorbing energy and often at least partially recovers after each hit. The energy absorbing unit includes an end wall which in one or more cases includes a number (X) of protruding anti-BSR accessories ("accessories"). Some energy absorbing units may not be provided with an anti-BSR accessory. If an energy absorbing unit is provided with an anti-BSR accessory, in one embodiment, the accessory is preferably shaped like an Archimedes screw or a helicoid that extends from a relatively planar end wall. In another embodiment, the accessory is configured as an upturned leaf spring extending from a domed end wall in a manner to be described.

Associated with a given energy absorbing unit, there is a number (X) of such accessories, where $1<=X<1000$. In some cases, a given energy absorbing unit may lack any accessories. In either embodiment, the accessories have a lower standing strength than the energy absorbing units form which they extend, so that the accessories dampen movement that may otherwise cause buzzes, squeaks and/or rattles between the end wall and an adjacent structure.

One aspect of the present disclosure includes a modified end wall structure that is superior to prior structures with respect to ease of manufacture, cost, and function in a manner to be described.

The improved energy absorber is created through a combination of designed geometry and tooling that creates in the leaf spring embodiment a "domed" flexible end wall of an energy absorbing unit. For the helicoid embodiment of accessory, the end wall is designed and engineered in such a way that it has some bulk so that part of its material can be gauged away without significant sacrifice to structural integrity. The accessory extends without separation from the end wall to form the Archimedes screw or helicoid (collectively, "helicoid"). The helicoid interacts with the reaction surface through a spring-loaded, touch or designed interference condition. On the other hand, the domed end wall associated with the leaf spring embodiment is relatively thin.

In the leaf spring embodiment, a frusto-conical side wall of the energy absorbing unit is maintained, but some or all of the end wall is convex or "domed". The leaf spring is turned upwardly from the end wall. In response to impact the side wall may buckle, but the energy absorbing unit may revert to its initial condition soon after impact. Together the energy absorbing unit and the accessory provide a rapid response to the desire to suppress buzzes, squeaks or rattles before or after or both before and after the hit without compromising energy absorbing characteristics.

In the leaf spring embodiment, the domed end wall extends from the inner radius of an annular perimeter of a substantially flat portion of the end wall. In another embodiment of the leaf spring accessory, the dome rises from the top of the side wall without an intervening annular perimeter. In either embodiment there is a tangential point contact between the leaf spring accessory of the energy absorbing unit and the adjacent structures that quietly minimizes the surface area in contact with the reaction surface. It is thought that the accessory absorbs some, but not much of the impact forces associated with a hit.

When the energy absorber is manufactured from a material (e.g., a planar sheet, in the case of thermoforming or its variants) of initial thickness (T), tooling is used to mold or coin the domed area representing the end wall to an average thickness (t) that in the leaf spring embodiment is substantially less than 0.5 (T), e.g., 0.1 (T). This makes the dome more flexible than the rest of the structure and isolates or localizes preferred flexibility at and around the dome. To make the helicoid form of anti-BSR accessory, excavation of a planar end wall by a milling tool for example initiates a coining step that creates a helicoid-like accessory that rises from the end wall.

As a frame of reference for the leaf spring embodiment, imagine the dome is represented by part of a hemispherical shell with a pole positioned at its highest point. Imaginary lines of longitude extend downwardly and radially therefrom. In one embodiment of accessory, the dome may be formed, lanced or cut parallel (or inclined) to the lines of longitude to create flexible "leaf springs" that provide additional flexibility when compared to a non-lanced dome of the same material thickness. A pie-shaped leaf spring-shaped element may be considered as having two edges with ends that meet at a pole. Another end lies at or towards an end wall if there is no annular perimeter extending inwardly from the top of a side wall. The edges and intermediate connecting material of the leaf spring define there between a living hinge with an inner radius that ends at the annular perimeter. In some embodiments the leaf springs have ends that are upwardly turned from the pole and reach towards a surface that receives a hit. By changing the shape and position of the cuts in the dome, in combination with selecting thickness of the dome, additional flexibility or strength may be imparted to meet anti-BSR performance objectives. It will be appreciated that the cuts need not intersect at the pole, but can intersect off-center in relation to the pole.

In another aspect of the invention, an energy absorber includes a base sheet and a plurality of frusto-conical energy absorbing units extending from the base sheet. Each energy absorbing unit has a side wall and leaf springs or helicoid-like accessories extending from a top or end wall that are oriented so that before impact there is minimal or no BSR because of the vibration-dampening effect of the accessories. But upon receiving the forces of impact ("incident forces"), the leaf springs or helicoids tend to be at least partially deflected or crushed. Impacting forces are then transmitted to the side wall which offers some resistance, deflects and partially reverts (springs back) to an un-deflected pre-impact configuration while exerting reaction forces to oppose the incident forces. This phenomenon effectively in a static mode (i.e., before the hit) is silent but in a dynamic mode cushions the blow by arresting the transmission of incident forces directed towards the mass or object to be protected (e.g., an anatomical member, a piece of sheet metal, an engine block, or the head of a passenger or player).

In another aspect of the present invention, a manufacturing method includes the substantially simultaneous steps of injection molding or forming an energy absorber with a base, side walls and an end wall. As described above, in one embodiment, the energy absorber has a base sheet and energy absorbing units extending from the base sheet. Several adjacent energy absorbing units may share parts of a common base. Some if not all of those units have a domed or planar top rising from side walls. The planar top may have helicoid-like feature. The domed top may have a leaf spring. The accessories serve as sound-deadening features with a weaker standing strength than the energy absorbing units.

In still another aspect of the present invention, an assembly method includes the steps of a. providing a component or other mass to be protected, such as an anatomical member or a headliner;
b. forming substantially simultaneously an energy absorber including energy absorbing units and optionally at least one domed end wall of one or more of the energy absorbing units. The end wall is associated with a helicoid-like or leaf spring-like accessory so that the energy absorber is configured to interface with the component or mass when placed adjacently, so that BSR from relative movement of the energy absorber and the adjacent component or mass is reduced or eliminated, and
c. assembling the energy absorber and the component or mass in adjacent or contiguous positions.

The disclosed energy absorber with leaf spring or helicoid anti-BSR accessories can be made by thermoforming, injection molding, vacuum forming or comparable techniques. Thermoforming, in one example, includes a heater for heating a flat sheet of a polymeric material, at least one thermoforming die for forming the flat sheet into a three-dimensional energy absorber, the absorber having a base sheet and a plurality of energy absorbing units with side walls and end walls with accessories extending therefrom. Suitable tooling is used to form the leaf springs or helicoids in a manner to be discussed later.

These and other aspects, objects, and features of the present invention will be understood and appreciated by those skilled in the art upon studying the following specification, claims, and appended drawings.

DETAILED DESCRIPTION OF THE INVENTION

Figure 1:
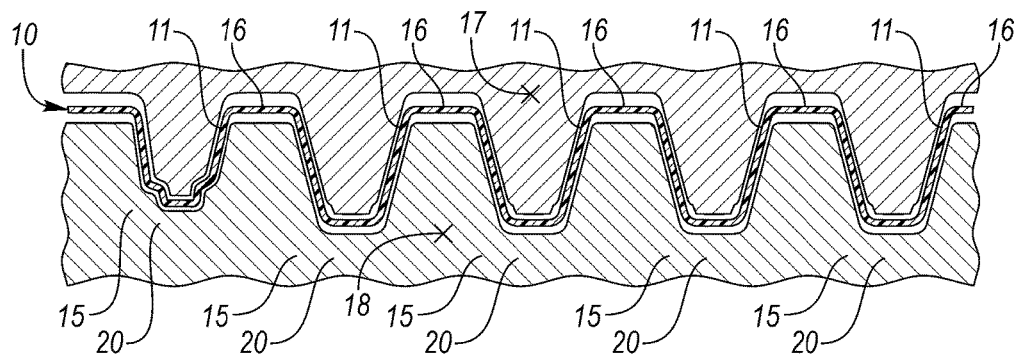
FIG. 1 is a cross-sectional view of opposing thermoforming dies for forming a sheet into an energy absorber with a plurality of energy absorbing units and planar or domed end walls extending from recesses formed in the base sheet. At least some of the units have integral one or more accessories in the form of helicoids or upwardly turned leaf springs (depicted later) for reducing buzzes, squeaks, and rattles ("BSR") upon installation.
Figure 2:
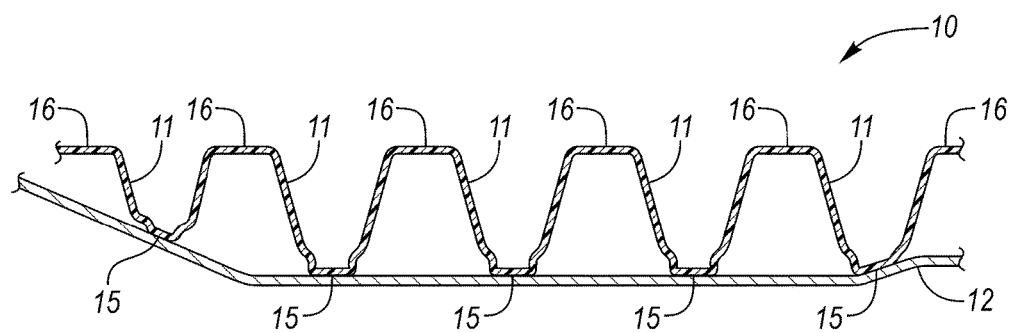
FIG. 2 is a cross-sectional view showing one embodiment of the thermoformed energy absorber of FIG. 1 positioned on or near an adjacent surface.
Figure 3:
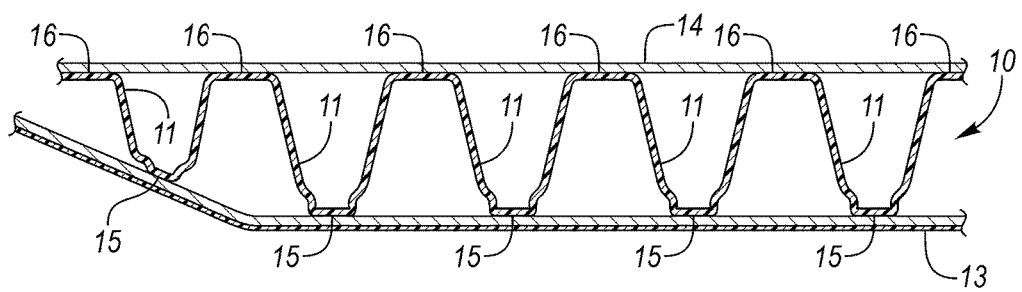
FIG. 3 is a cross-sectional view showing the energy absorber installed between for example a roof structure of a passenger vehicle and a headliner or a helmet and the head of a wearer.

FIG. 1 illustrates an exemplary non-limiting thermoforming process step in which an energy absorber 10 is shaped between a male (upper) die and a female (lower) die. If desired the dies could be inverted. FIG. 2 shows one embodiment of a product so formed. FIG. 3 depicts the energy absorber interposed between for example a vehicle roof 14 and a headliner 13, although the invention is not so limited.

Figure 4:
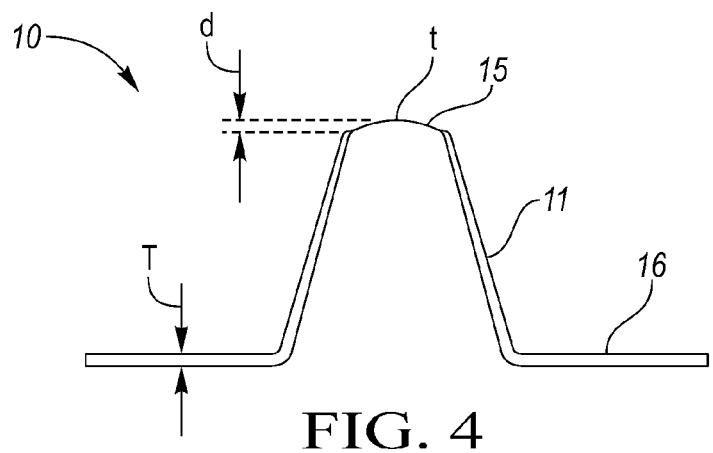
FIG. 4 is a cross section through one form of energy absorbing unit having a coined dome-shaped end wall before a leaf spring form of accessory is made to extend therefrom.
Figure 5:
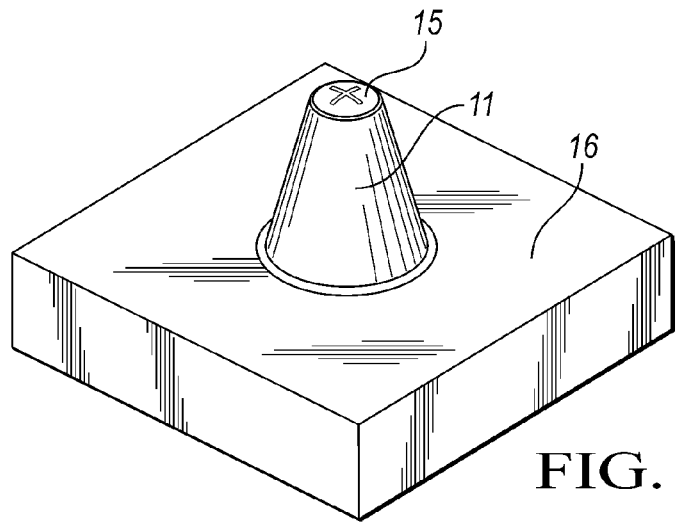
FIGS. 5-6 are isometric views of a single energy absorbing unit with slits in an end wall thereof.
Figure 6:
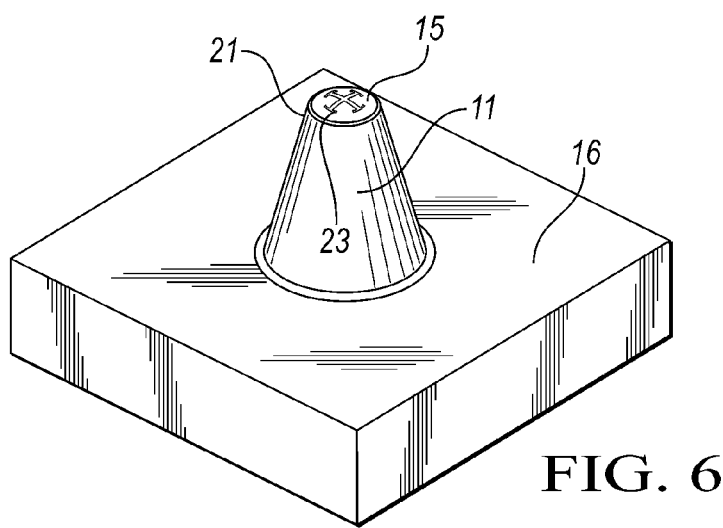
Figure 7:
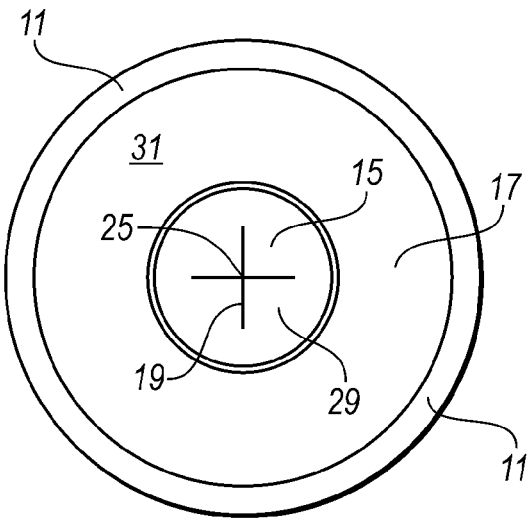
FIGS. 7-8 are top views of the units depicted in FIGS. 5-6 show upturned leaf spring-like ears formed in an end wall.
Figure 8:
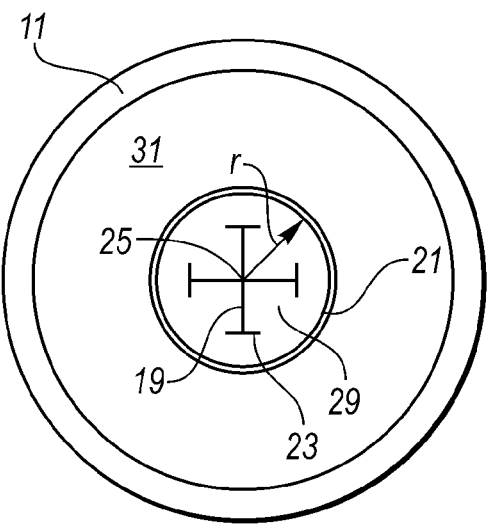
Figure 9:
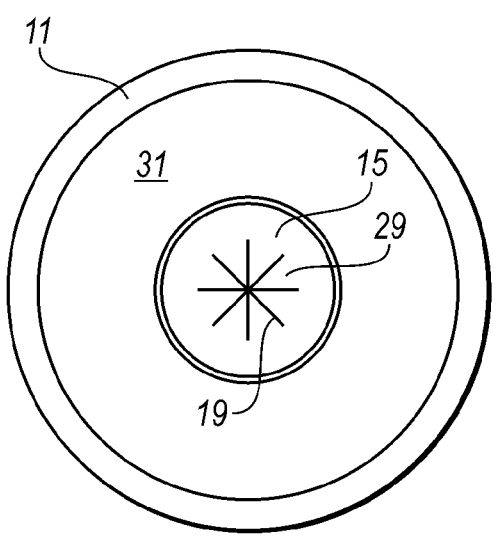
FIG. 9 is a top view of an alternate embodiment.

FIG. 4 is a cross section through one energy absorber 10 with a domed end wall 15. If the anti-BSR accessory is a leaf spring, the average thickness (t) of the domed end wall is substantially less than that (T) of a base 16 or sidewalls 11. The sidewalls 11 may or may not have breaches in order to tune their resistance to impact. As used herein, (1) a "breach" means a slit or a slot running upwardly and downwardly in at least a part of a sidewall 11; (2) a "slit" means a cut or incision made so little or no material is removed; and (3) a "breach" means an elongated opening between opposing faces. A dome 15 promotes flexibility in the interfacial region between the energy absorber 10 and a surface with which it is juxtaposed. In one example where a helicoid anti-BSR accessory is formed, a planar form of the end wall 15 is subjected to a milling step (see FIG. 14) that creates an Archimedes screw-like or helicoid-like accessory (FIGS. 11-13) that is attached to the end wall 15 before collision with an impacting object. It will be appreciated that the term "Archimedes screw" is not limited to a strict geometric definition. For instance, adjacent turns may have different radii and pitches and the "Archimedes screw" may effectively resemble a corkscrew with turns having a radius that diminishes with distance from the domed end wall 15. Similarly for the term "helicoid".

A leaf spring embodiment of anti-BSR accessory is shown in FIGS. 5-9. If desired, a thinned domed region 15 may be cut or lanced longitudinally and/or laterally to create slits 19 in a manner to be described to create upwardly turned leaf springs that enhance flexibility, offer anti-BSR characteristics and create pre-engineered zones of weakness. By "laterally", the applicants mean slits or slots 23 (FIGS. 6, 8) that extend parallel to or inclined to imaginary lines of latitude at the terminal ends of longitudinally extending slits 19 beginning at the pole 25 of a domed end wall 15. The cuts need not intersect at a pole. If desired, some material may be absent from the converging ends of the leaf springs to create a void at their intersection.

In several embodiments of the invention the disclosed energy absorber has a base sheet 16 and a plurality of energy absorbing units 11 that preferably are reusable after exposure to one or more impacts. The energy absorbing units 11 extend from the base sheet 16. In practice, in an optional thermoforming process, the energy absorbing units are formed from the material which constituted the base 16 before deformation. In the case of the leaf spring accessory, a wall "thinning" phenomenon occurs (See FIG. 4). Each energy absorbing unit 11 has an end wall 15 and a side wall 11 that in some cases revert at least partially towards an un-deflected configuration after impact. Impacting energy is transmitted through the accessory, whether it be an Archimedes screw or helicoid 27 (FIGS. 11-13) or leaf spring 29 (FIGS. 5-9) (collectively, "accessory") to the domed end wall 15 and then to an annular perimeter if present and then to the sidewall 11 which absorbs most or all of the remaining energy after being impacted.

In an exemplary case, the end wall 15 of at least one energy absorbing unit 10 has a number (X) of integrally-formed accessories 27, 29 as described above that extend from a flat or domed wall 15, where $1<=X<1000$. The domed wall 15 may arise from and between the tops of the side walls 11 or from an inner radius (r, FIG. 8) of an annular ring 31 that extends between the tops of the side walls 11.

In some cases, the energy absorbing unit 11 reverts to an un-deflected or compression set configuration after a first impact. As used herein the term "compression set" means a configuration before impact in which an energy absorbing unit lies after being squeezed or compressed into position between for instance a Class A surface (e.g. a bumper fascia) and a rigid block or sheet of metal (e.g. a bumper frame). In other cases, the energy absorbing unit may revert to or towards the compression-set configuration after multiple impacts.

To absorb impact forces, the side wall 11 of an energy absorbing unit 10 bends in response to impact, like the wall of a concertina or bellows and springs back to or towards an un-deflected configuration in further response to impacting forces. In some cases opposing side walls 11 of an energy absorbing unit 10 bend at least partially convexly after impact. In other cases, opposing side walls of the energy absorbing unit bend at least partially concavely after impact. Sometimes, opposing side walls 11 of the energy absorbing unit 10 bend at least partially concavely and convexly after impact.

As indicated above, in one embodiment, the energy absorber has an energy absorbing unit 10 with an end wall 15 that includes an annular ring 31 around the perimeter of the end wall 15. The domed end wall 15 rises from the inner radius of the annular ring 31. Alternatively, the domed end wall 15 is supported by an upper periphery of the side wall 11 and deflects inwardly, thereby absorbing a portion of the energy dissipated during impact.

Several alternative designs call for at least some of the accessories 27, 29 to be formed in material that originates from the base sheet 16. In others, as described above, an accessory is formed in the end wall 15 of an energy absorbing unit 10.

Aided by these structures, the disclosed energy absorber can be quietly re-used after single or multiple impacts between the hits (in a quiescent or "static" mode) or during the step of absorbing energy following a hit (in a "dynamic" mode). For example the hockey or football player or cyclist need not change his helmet after every blow. Most of the recovery occurs quite soon after impact. The remainder of the recovery occurs relatively late in the time period of recovery.

As noted above, in a given end wall 15 there is optionally a number (X) of leaf springs 29, where $1<=X<10$. Some or all end walls 15 have slits 19 originating at or near an imaginary pole of a generally or partially hemi-spherically shaped or flattened domed end wall 15. As used herein the term "hemispherical" is not limited in a geometrical sense to half of a sphere. It may describe or qualify a spheroid or oblate spheroid for example, like a squashed orange or pear or a section of an American football.

As to the shape of the energy absorbing units 11, it is useful to define an annular perimeter 17 (FIGS. 7-9) of the end wall 15 inside the side wall 11. In one case, the annular perimeter 17 has an inner radius (r) from which the domed end wall 15 rises. Alternatively, the domed end wall 15 may rise from an upper perimeter of the side wall 11 (e.g. FIGS. 5-6).

It is contemplated that the "soft" anti-BSR accessory 27, 29 can be formed integrally with the material of the end wall 15 of an energy absorbing unit 10 at or near the location(s) of potential buzz, squeak, or rattle BSR noises. For example, the side wall 11 may be thinner than the base 16, and especially in the case of the leaf spring embodiment, the domed end wall 15 may be thinner than the side wall 11 (FIG. 4). As used herein the term "coined" connotes material flow that occurs during a drawing step. Thus, there is a continuity of material between the accessory 27, 29 and the end wall 15 so that separation there between does not occur under normal operating conditions.

Where deployed, the anti-BSR accessory 27, 29 has a relatively lower longitudinal/standing strength than the associated energy absorbing unit 10. Though the sidewall 11 of an energy absorbing unit 10 may buckle and assume a permanent deformation following impact, the accessory 27, 29 flexes and reverts after the hit to or towards its pre-impact configuration. Accordingly, it acts as a dampener or sound deadener, thus greatly reducing the likelihood of significant BSR noises in the final assembled product (non-limiting examples include an automotive vehicle or crash helmet for a motor cyclist or a helmet for the skier, hockey player or football player). Further, a significant assembly cost reduction and mass reduction can be realized with only a minimal or zero increase in the tooling and/or manufacturing cost because various wadding or muffling materials are no longer needed.

Various energy absorbing constructions are meant to be suggested in the drawings. Persons skilled in this art will understand that the present disclosure is not limited to headliners, but instead can be applied to many other applications, including but not limited to other locations in a vehicle (e.g., doors, instrument panels, trim components for A, B and C pillars and roof supporting structures of vehicles and other components), various types of protective headgear, and other protective gear that intercedes between an anatomical member (e.g., a knee, elbow, stomach) and an impacting object.

Figure 11:
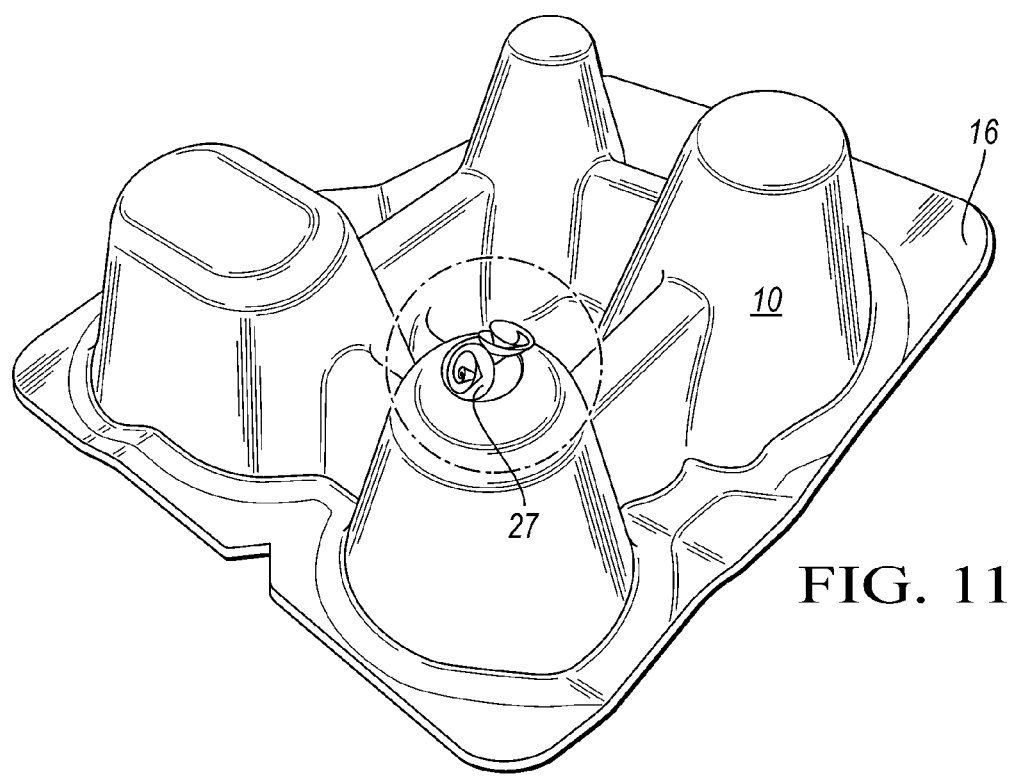
FIG. 11 is an isometric view of an arrangement of energy absorbing units, one of which having a planar end wall from which a pair of helicoids extends.

In one embodiment, an energy absorber 10 (illustrated in FIGS. 1-3 and 11) includes a uniformly arrayed matrix or random arrangement of energy absorbing units 10. As represented in FIG. 11, those units may have a wall shape that can be described as hollow frusto-conical, distended frusto-conical (e.g. with an oval or elliptical footprint/lower perimeter/upper perimeter or cross section), cup-shaped (with a wall that is curvilinear—e.g., bowed, convex or concave when viewed from the side—or flat). Those units 10 may have an end wall 15 that is domed or hemi-spherical. Also, the wall configuration may resemble a flat-sided pyramid. As mentioned earlier, at least some of the energy absorbing units 10 have the BSR accessory 27, 29 extending from an end wall 15 of an energy absorbing unit 10. In the leaf spring form 29, many of the accessories before impact curl upwardly, out of the plane of for example FIGS. 7-9. In some cases the accessory 27, 29 may effectively be flattened somewhat (FIGS. 5-6) when placed, wedged or braced in position before impact.

The energy absorbing units 10 can be arranged on the energy absorber in any repeating or non-repeating, uniform or non-uniform pattern desired, such as an orthogonal or diagonal matrix of rows (parallel or converging) and columns (parallel or converging) that would partially or totally cover the mass to be protected, for example a vehicle roof from its side-to-side and from the front-to-rear of a vehicle's passenger compartment.

Further, the energy absorbing units 10 can be similar to each other or can be varied (e.g. FIG. 11), so as to have different or similar footprints, widths, heights, and/or cross-sectional shapes (e.g., inclined or perpendicular to the base sheet 16). The energy absorbing units 10 can have uniform or non-uniform spacing and/or different lateral relationships and/or be varied to accommodate the spatial constraints imposed by the environment of use, such as the vehicle roof and mating structures as needed for quiet energy absorption in different areas of the assembly. For example, the energy absorber can have different regions. Some regions may have energy absorbing units 10 arranged or configured a first way, and other regions having energy absorbing units 10 arranged or configured a second or different way. This is often the situation where energy absorbers are used in for example vehicle roof structures, as will be understood by persons skilled in this art. After thermoforming or injection molding, the base sheet 16 may be flat or bent as desired.

As an example, the illustrated energy absorber 10 can be thermoformed from a heated sheet 16 of a polyolefin polymeric material such as that available from Lyondell Bissell under the product name SV 152. The sheet is heated to a temperature below its melting point and positioned between by opposing forming dies 17, 18 (see FIG. 1), and then cooled to form a three-dimensional energy absorber (see FIG. 2). Opposing forming dies 17, 18 are illustrated, but it is contemplated that the present inventive products can be made using other forming processes, such as a thermoforming process using only a single sided die (e.g. by vacuum thermoforming). Optionally the absorber is made by softening a sheet of starting material and positioning it across a tool with which it is made to conform under a vacuum. It will be appreciated that the present inventive products can be made by other forming processes, such as injection molding, compression molding, and the like.

The leaf spring form of anti-BSR accessory can be made for example, if the tool is short enough, say 30 inches in length or less, with a second tool in the trim station that would push a tool from the base through the slits in the cone top. Alternatively, the leaf spring could be made in a knock out station downstream from a trim station. Optionally, the leaf spring could be made in a stacker station downstream from the trim and knock out station. Another way to make the leaf spring could be by using an off line fixture.

Once formed, the illustrated energy absorber 10 is adapted to fit between and generally at least partially bridge a gap between for instance a vehicle headliner 13 and its roof 14 (see FIG. 3). In the exemplary application depicted, the energy absorbing units 10 are generally configured to occupy at least some space between the headliner 13 and roof 14. The accessories 27, 29 extending from the end walls 15 or if desired from the base 16 of the energy absorbing units 10 generally touch the contoured mating surfaces on the headliner 13 and roof 14.

As noted earlier, the illustrated energy absorber has differently shaped energy absorbing units 10 that are configured to meet spatial or aesthetic requirements and cover protruding bolts plus other fittings while optimizing BSR reduction and the safe absorption of energy and distribution of impact loads to reduce at least in vehicular applications passenger head injury (such as during a vehicle crash or roll-over accident) or in other non-vehicular applications (such as head- or limb-protecting gear).

As noted earlier, the anti-BSR accessory 27, 29 is integrally formed in, is supported by and extends from the associated end wall 15, as illustrated. An energy absorber may have energy absorbing units 10, each having a number (X) of accessories 27, 29, where 0<=X<1000.

The accessories 27, 29 have a lower standing strength than the energy absorbing units 10. Their "softness" reduces the potential for BSR noises caused by repeated noise-generating vibration and/or cyclical movement of the energy absorber 10 against adjacent rigid surfaces on for example the headliner 13 and roof 14.

In end wall 15, the illustrated anti-BSR accessory 29 (FIGS. 7-9) preferably is formed by a rounded male protrusion 20 that extends from the top die 17 (FIG. 1) into a mating recess in the lower die 18. The protrusions 20 include at least part of a hemispherical or near-hemispherical dome. As a consequence the sheet material assumes a shape after cooling that resembles a dome-shaped thin-walled hollow BSR accessory 29. It will be appreciated that the dome may be described by an angle of latitude (in terrestrial terms) less than 90 degrees, i.e., the dome need not be a geometrically perfect hemisphere.

In some cases the base sheet 16 (or roof, depending on orientation) of an energy absorbing unit 11 itself may be domed to form a leaf spring-like or helicoid-shaped accessory 27, 29 so as effectively to interface with a neighboring structure, thereby reducing an area of contact there between and reducing or eliminating BSR.

Figure 12:
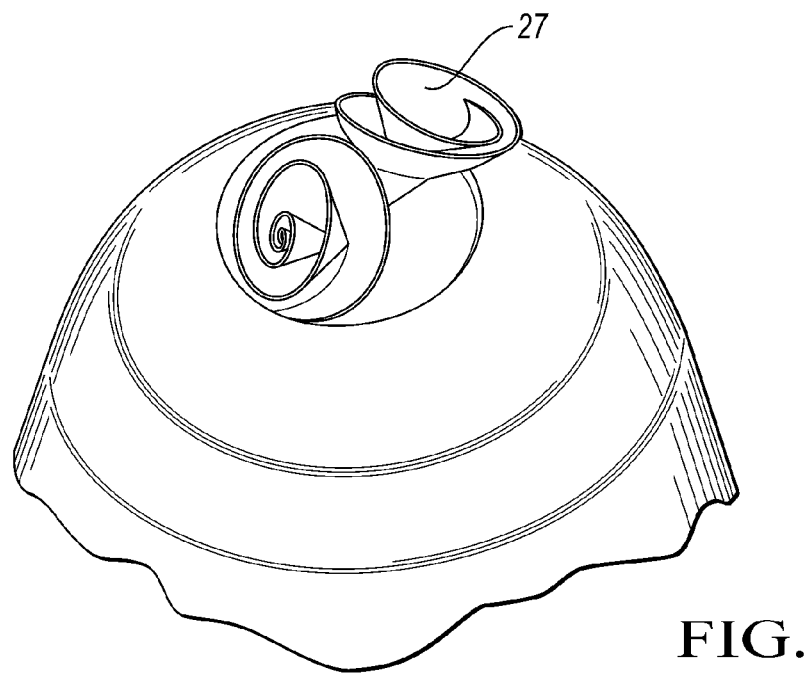
FIG. 12 is an enlargement of part of FIG. 11.
Figure 13:
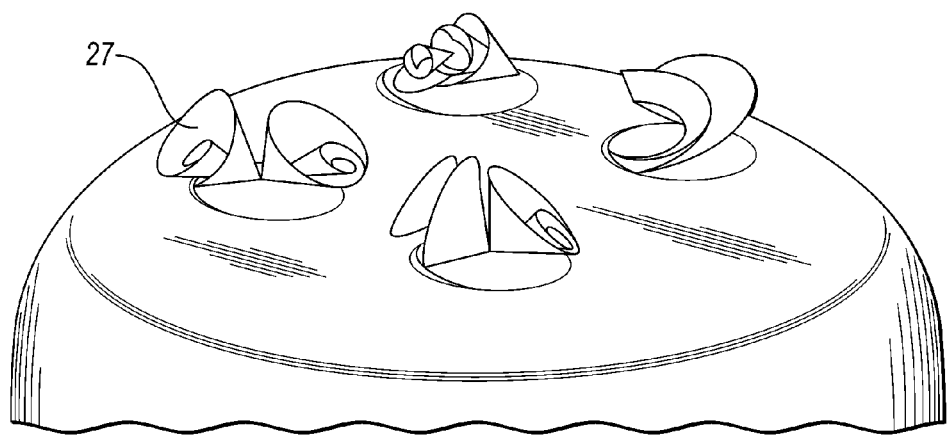
FIG. 13 depicts an end wall of an energy absorbing unit from which multiple helicoids extend.

The illustrated anti-BSR domed end walls 15 are sufficient in length and strength to maintain their generally hemispherical shape after the starting sheet material is cooled (see FIG. 12). In particular, the height of the anti-BSR end walls 15 plus any accessories 27 in combination with energy absorbing units 10 is greater than any expected gap between the headliner 13 and the roof 14 (in vehicular applications), such that the anti-BSR accessory 27 contacts the headliner 13 (or roof 14) and is compressed to a compression set position during assembly into the vehicle.

The domed anti-BSR end walls 15 also compensate for variations in the gap size due to part tolerance variation, assembly stack-up variations, and other process and part variables that may lead to inconsistent gaps. This results in the accessories 27, 29 acting to dampen any cyclical or vibratory movement of the energy absorber 10, which in turn eliminates most BSR noises.

As an example, it is contemplated that the leaf spring form of anti-BSR accessories 27, 29 can be about ⅛ to ½ inch in height (or more typically about ¼ to ⅜ inches), and at their base about 1/32 to ¼ inch in diameter (or more preferably about 1/16 to ⅛ inch in diameter).

Figure 10:
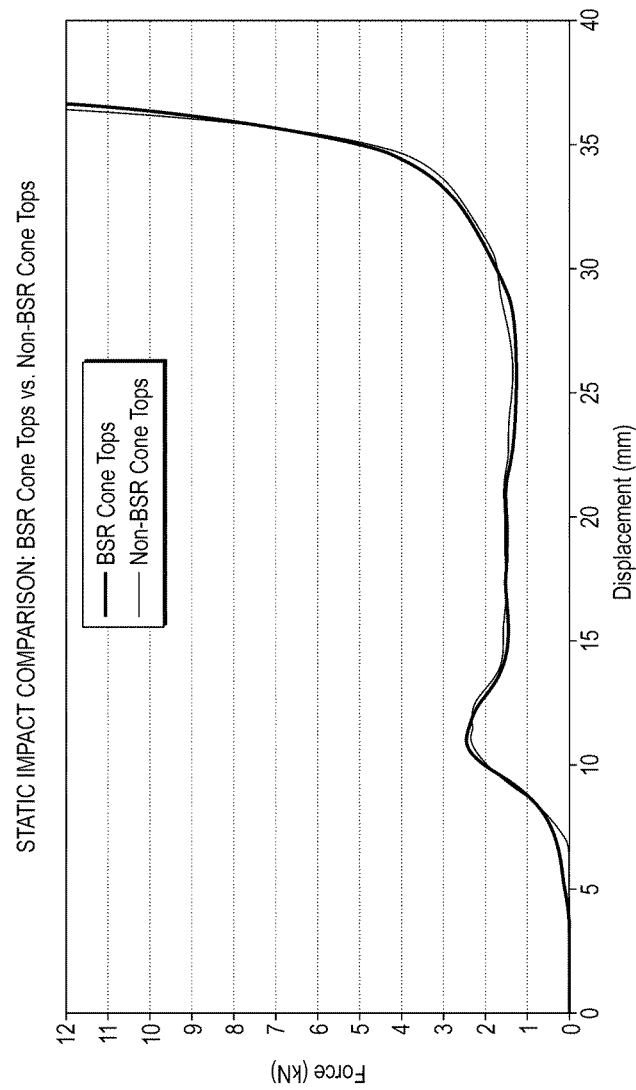
FIG. 10 is a force-displacement graph that illustrates an exemplary response of energy absorbing units with and without an accessory.

As mentioned earlier, the accessory 27, 29 is preferably sufficiently flexible so that it deflects at relatively low loads in a relatively elastic manner. The term "relatively low load" as used herein is defined as less than 2 lb·f at each point of contact. By comparison, the energy absorbing unit itself typically collapses at loads in excess of 10 lb·f (see, e.g. FIG. 10). In this way, flexibility is substantially localized at the end wall 15.

One manufacturing technique involves coining. Though other methods may be suitable, coining is effected by providing a rigid lower member (typically metal) and an upper coining member. A representative configuration is a matched metal set and a material which is more rigid than the molten plastic (like a rigid silicone rubber). This prompts displacement of material away from the domed end wall 15, preferentially thinning the dome in the contacted area if it is desired to make the leaf spring form of anti-BSR accessory. Other things being equal, the thinner the material, the less resistance is required to displace the dome 15. Furthermore, by relieving the dome 15 with cross cuts 19, 23 as described above, the resistance required to displace the dome is further reduced.

Figure 14:
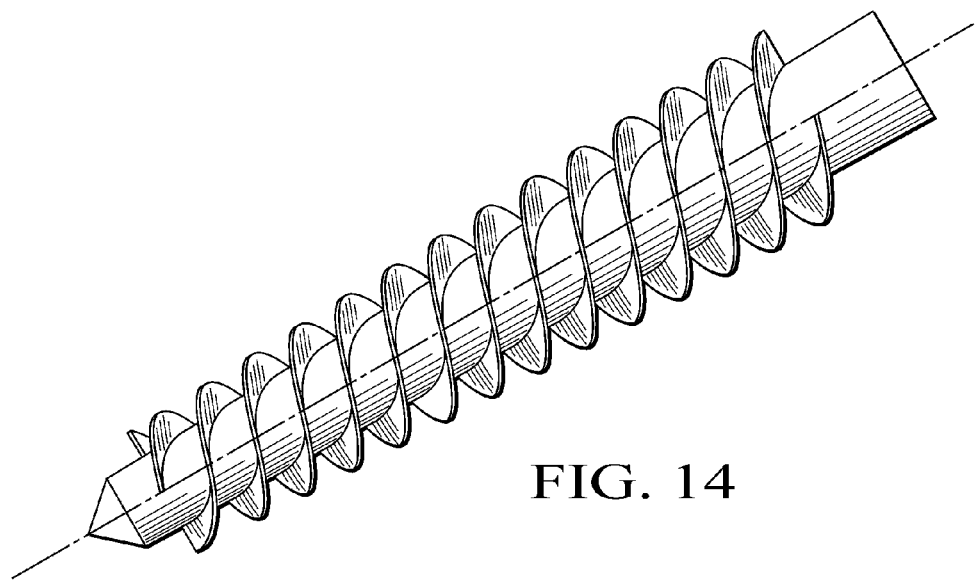
FIG. 14 shows one form of drill bit that may be used to create helicoids.

One form of drill bit that can be used to make the helicoids 27 (FIGS. 11-13) is shown in FIG. 14. Manufacturing parameters include:

Drill Bit Fluting—Drill bits preferably have one to four flutes. The angle of the flue relative to the surface relates to the way in which the bit bites into the material. The flute needs to be steep enough so that when the drill is plunged into the material that it bites into the plastic but not so steep that the material is sheared. Each flute in the face of an end mill will produce one coil.

Drill Bit Flute Diameter—The larger the diameter of the drill bit, the larger the diameter of a coil in the helicoid. It may be desirable to have larger diameter coils for cone tops with greater surface area and smaller diameter coils for cones with smaller tops. Changing the diameter of the bit is one way to accomplish this.

Rate of Drill Penetration—The amount of material coiled for each revolution of the drill is proportional to the rate of penetration. It may be desirable to vary the rate of penetration to create a top of the coil with thinner coils than the base, for instance. To achieve this one would start penetrating at a slow speed and then increase the rate of penetration to take a bigger "bite" with each revolution. One could create a thicker coil top and a softer coil "stem" by doing the reverse process.

Depth of Drill Penetration—There is a finite amount of material thickness available to draw the coils from. The thicker the plastic, the easier it is to make this form of BSR accessory.

Figure 15:
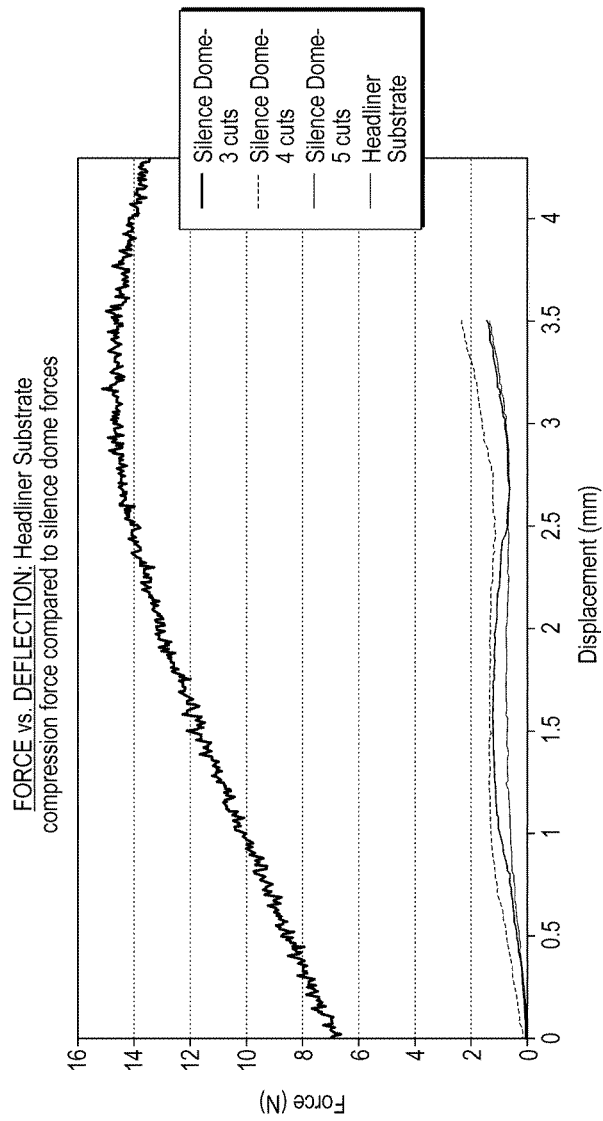
FIG. 15 is a graph of force-deflection characteristics.

FIG. 15 is a graph comparing the force deflection characteristics of various embodiments of leaf spring accessorized energy absorbing units with a various number of "cuts" compared to the deflection of a headliner substrate itself when tested under the SAE J949 three point bend test incorporated by reference.

Relative to the leaf spring anti-BSR accessories, it is desirable to tune their stiffness up and down. The force to compress the domed end wall 15 decreases with an increasing number of cuts 19.

Preferably, the end wall 15 and accessories 27, 29 need to deflect before the headliner substrate deflects. As shown, the headliner deflects between 6-16N. The accessories 27, 29 deflect around 1N. Different substrates have different stiffnesses when tested per the SAEJ949 3 point bend test.

Here is some additional representative process information in making the helicoid form of accessory:

Tool: Single Flute End Mill
Tool diameter size: variable based on material thickness of cone top
RPM: 120
Feed Rate: 0.015 per Revolution
Depth of Penetration: −0.005 of material thickness at cone top Using the tooling and drilling process methods described above, the engineer is able to select appropriate inputs (drill flute, drill diameter, depth of penetration, penetration rate) to achieve a desired output (coil diameter, coil thickness, coil stiffness, coil pitch, coil length) of helicoid accessory for a given application. More or less resistance may be desired and these outputs provide can be tuned based on the inputs to achieve the desired resistance.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vibration-reducing energy absorber for positioning between an outer surface that receives an impact and a lower surface to be protected from impacting forces, the absorber comprising:
  a base sheet and
  a plurality of energy absorbing units extending from the base sheet, each energy absorbing unit including an end wall and a side wall that absorbs energy by bending or buckling after being impacted, wherein
  the end wall includes a number (X) of accessories for reducing vibration associated with buzzes, squeaks and/or rattles, where 1<=X<1000 and the accessory includes a helicoid.

2. The energy absorber defined in claim 1, the number (X) of accessories is one.

3. The energy absorber defined in claim 2, further including
  a domed portion of the end wall including one or more breaches,
  the domed portion including at least a part of a hemisphere characterized by imaginary lines of longitude that extend from a polar portion of the domed portion and imaginary lines of latitude that extend orthogonally thereto, the breaches being parallel or inclined to at least some of the lines of longitude.

4. The energy absorber defined in claim 3, further including one or more latitudinally oriented breaches that extend from a distal end of at least some of the longitudinal breaches.

5. The energy absorber defined in claim 4, wherein the domed portion has slits that extend outwardly from a polar portion thereof.

6. The energy absorber defined in claim 5, wherein there are four longitudinal slits.

7. The energy absorber defined in claim 1, wherein the side wall bends in response to impact and springs back towards an un-deflected configuration in response to impacting forces.

8. The energy absorber defined in claim 1, wherein a pair of helicoids extends from an end wall.

9. The energy absorber defined in claim 1, wherein opposing side walls of an energy absorbing unit bend at least partially concavely and/or convexly after impact.

10. The energy absorber defined in claim 1, wherein the end wall includes an annular perimeter with an inner ring from which the domed portion of the end wall extends.

11. The energy absorber defined in claim 2, wherein the end wall is supported by an upper periphery of the side wall so that the domed portion rises from an inner radius of the upper periphery.

12. The energy absorber defined in claim 1, wherein a domed end wall is formed in the base sheet and an accessory is associated with the domed end wall.

13. The energy absorber defined in claim 10, wherein the end wall is subjected to a coining step that creates a thickness profile in the end wall while the energy absorber is formed.

14. The energy absorber defined in claim 1, wherein the accessory includes a leaf spring and one or more of the end walls has a wall thickness (t) that is thinner than that of the base (T) and the sidewall.

15. An energy absorber comprising:
  a base sheet;
  a plurality of energy absorbing units extending from the base sheet, at least some of the energy absorbing units including
  a side wall that absorbs energy by partial deformation and reverts toward an un-deflected configuration after the associated energy absorbing unit is impacted; and
  an end wall atop the side wall, the end wall being planar and including a number (X) of helicoids, where 1<=X<1000.

16. The energy absorber defined in claim 15, wherein the energy absorbing units have a shoulder at an intersection of the side wall and the base sheet.

17. The energy absorber defined in claim 16, wherein the shoulder when viewed from above the base is of a shape selected from the group consisting of a circle, an oval, an ellipse and a polygon.

* * * * *